United States Patent
Begen et al.

(10) Patent No.: US 8,731,000 B2
(45) Date of Patent: May 20, 2014

(54) DECODING EARLIER FRAMES WITH DTS/PTS BACKWARD EXTRAPOLATION

(75) Inventors: Ali C. Begen, London (CA); Tankut Akgul, Istanbul (TR); Arturo A. Rodriguez, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 12/569,982

(22) Filed: Sep. 30, 2009

(65) Prior Publication Data

US 2011/0075997 A1    Mar. 31, 2011

(51) Int. Cl.
*H04N 7/12*    (2006.01)

(52) U.S. Cl.
USPC .................. 370/503; 375/240.12; 375/240.27

(58) Field of Classification Search
USPC ......... 370/211, 352, 359, 401, 466, 249, 474, 370/503; 375/240.12, 240.16, 240.24, 375/240.26, 240.27; 386/46, 124, 125, 105, 386/356, 329, 241, E5.001
See application file for complete search history.

(56) References Cited

U.S. PATENT DOCUMENTS

| | | | |
|---|---|---|---|
| 6,882,637 B1 * | 4/2005 | Le et al. ........................ | 370/349 |
| 6,912,224 B1 | 6/2005 | Duault ........................... | 370/412 |
| 7,023,926 B2 * | 4/2006 | Matsuura et al. ......... | 375/240.27 |
| 7,245,600 B2 | 7/2007 | Chen ............................. | 370/335 |
| 7,324,444 B1 | 1/2008 | Liang ............................. | 370/230 |
| 7,643,513 B2 * | 1/2010 | Yang et al. .................... | 370/503 |
| 7,830,908 B2 | 11/2010 | Akgul et al. | |
| 8,111,971 B2 | 2/2012 | Akgul | |
| 2003/0231870 A1 | 12/2003 | Nagahara et al. | |
| 2005/0033177 A1 | 2/2005 | Rogers et al. ................. | 600/455 |
| 2007/0009235 A1 | 1/2007 | Walters ......................... | 386/112 |
| 2007/0121620 A1 * | 5/2007 | Yang et al. .................... | 370/389 |
| 2008/0168470 A1 | 7/2008 | Bushell et al. | |
| 2008/0175558 A1 | 7/2008 | Shin et al. | |
| 2008/0304810 A1 * | 12/2008 | Rijckaert et al. ............... | 386/68 |
| 2008/0310647 A1 * | 12/2008 | Mukaide ......................... | 381/77 |
| 2009/0116814 A1 * | 5/2009 | Morohashi et al. ............. | 386/65 |
| 2009/0122192 A1 | 5/2009 | Baldwin et al. | |
| 2009/0129752 A1 | 5/2009 | Yamada et al. | |
| 2009/0141793 A1 | 6/2009 | Gramelspacher et al. | |
| 2009/0154615 A1 | 6/2009 | Hijikata et al. | |
| 2010/0254408 A1 | 10/2010 | Kuno et al. | |
| 2010/0254673 A1 | 10/2010 | Begen et al. | |

OTHER PUBLICATIONS

U.S. Appl. No. 12/416,338, filed Apr. 1, 2009, entitled "Supplementary Buffer Construction in Real-Time Applications without Increasing Channel Change Delay", Inventors: Ali C. Begen and Tankut Akgul.

U.S. Appl. No. 12/264,198, filed Nov. 3, 2008, entitled "Systems and Methods of Reducing Delay in Decoding", Inventors: Tankut Akgul, Ali C. Begen, and William Ver Steeg.

(Continued)

*Primary Examiner* — Hassan Phillips
*Assistant Examiner* — Saba Tsegaye
(74) *Attorney, Agent, or Firm* — Merchant & Gould

(57) ABSTRACT

In one method embodiment, receiving a video stream comprising a first compressed picture without associated time stamp information and a second compressed picture having associated first time stamp information, the second compressed picture following the first compressed picture in transmission order; deriving second time stamp information based on the first time stamp information; and processing the first compressed picture based on the second time stamp information.

19 Claims, 5 Drawing Sheets

(56) References Cited

OTHER PUBLICATIONS

U.S. Appl. No. 60/992,714, filed Dec. 5, 2007, entitled "Fast Channel Change of Digital Media Using Multiple Decoder Clocks", Inventor: Tankut Akgul.

deCastro, "Real-time Subtitle Synchronization in Live Television Programs," IEEE, p. 1-6, Jun. 8-10, 2011.

U.S. Non-Final Office Action mailed Mar. 26, 2012 in U.S. Appl. No. 12/416,338, 25 pages.

U.S. Final Office Action mailed Nov. 2, 2012 in U.S. Appl. No. 12/416,338, 27 pages.

* cited by examiner

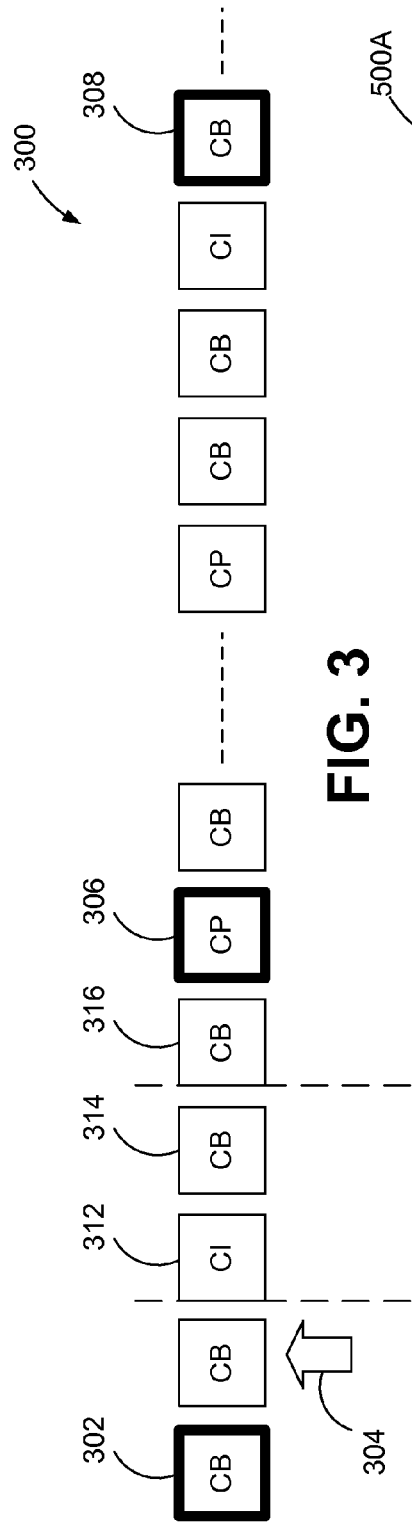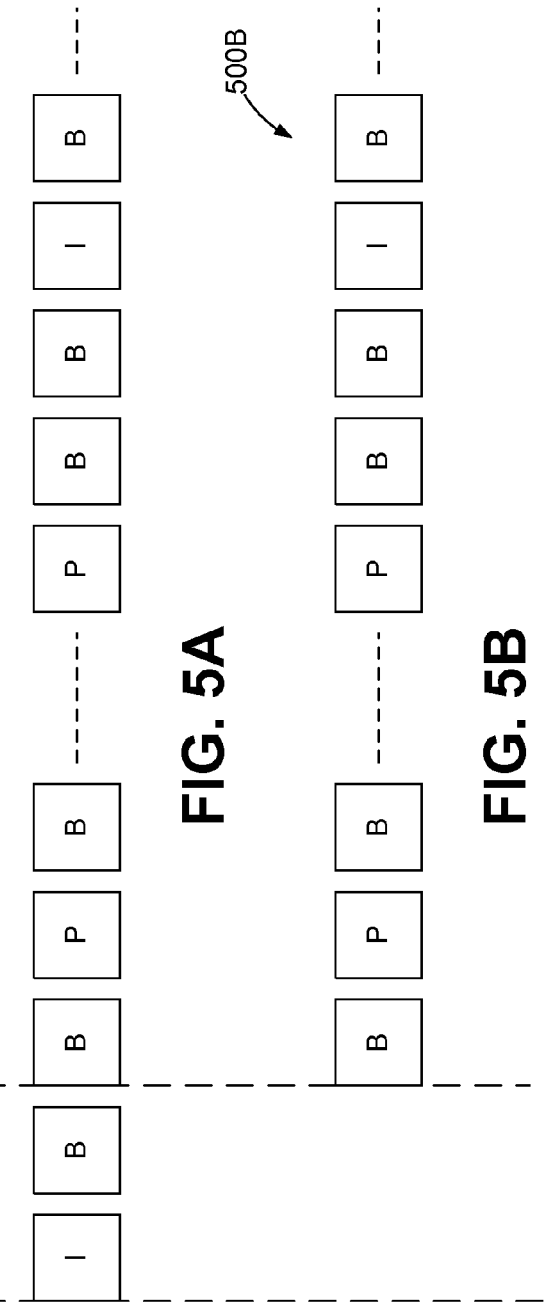

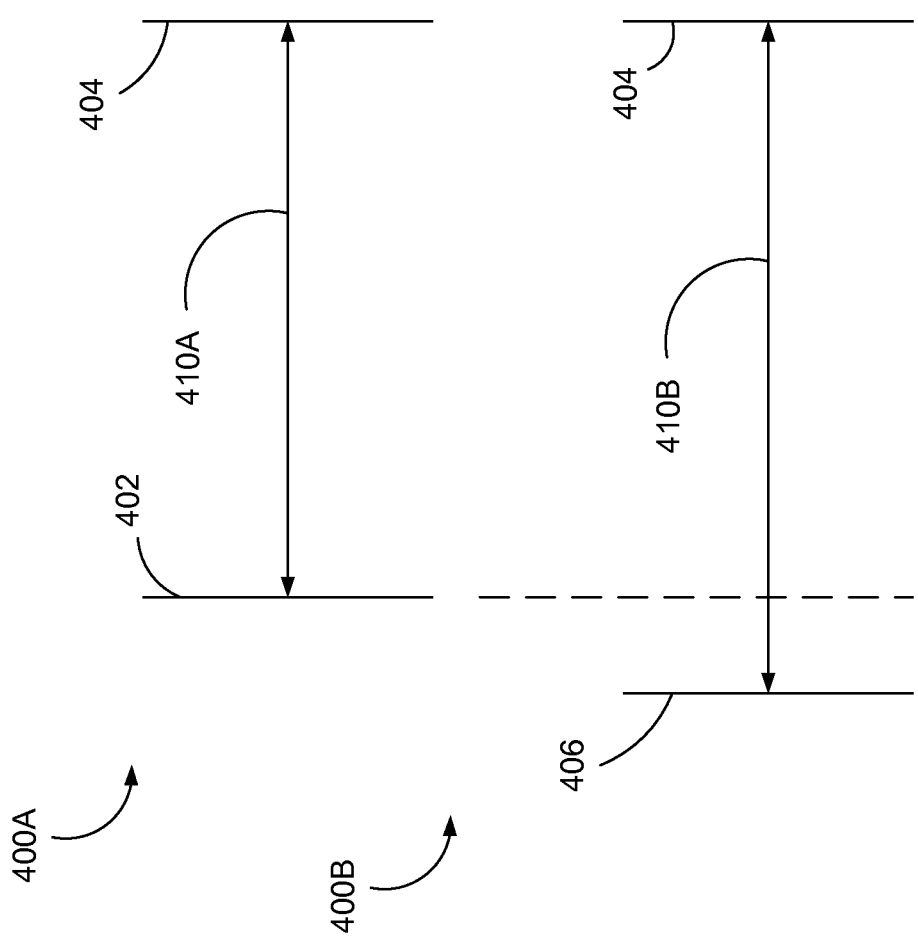

US 8,731,000 B2

DECODING EARLIER FRAMES WITH DTS/PTS BACKWARD EXTRAPOLATION

TECHNICAL FIELD

The present disclosure relates generally to video processing.

BACKGROUND

Transmission of digital audiovisual content to customer premises is accomplished today according to a variety of mechanisms, ranging from transmission across traditional cable and satellite television networks to computer networks (e.g., Internet Protocol Television or IPTV) where digital television services are provided using Internet protocol (broadband). At the customer premises, a digital receiver comprises functionality to receive and decode the digital audiovisual content and process for presentation the reconstructed video and/or audio on a display and sound component or generally a multi-media device. Certain stream transition events associated with the transmission of digital audiovisual content may impose delays in the decoding and presentation of the transmitted content.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 is a block diagram that illustrates an example sequence of compressed pictures of a video stream in transmission order received and processed by an embodiment of a TSE system.

FIGS. 4A-4B are block diagrams that illustrate various embodiments of backwards extrapolation periods (BEPs) that serve as a basis for computing extrapolated time stamp information.

FIG. 5A is a block diagram that illustrates reconstructed pictures generated from the example sequence in FIG. 3 based on unexpired, extrapolated time stamp information.

FIG. 5B is a block diagram that illustrates reconstructed pictures generated from the example sequence in FIG. 3 based on a portion of extrapolated time stamps.

DESCRIPTION OF EXAMPLE EMBODIMENTS

Overview

Figure 1:
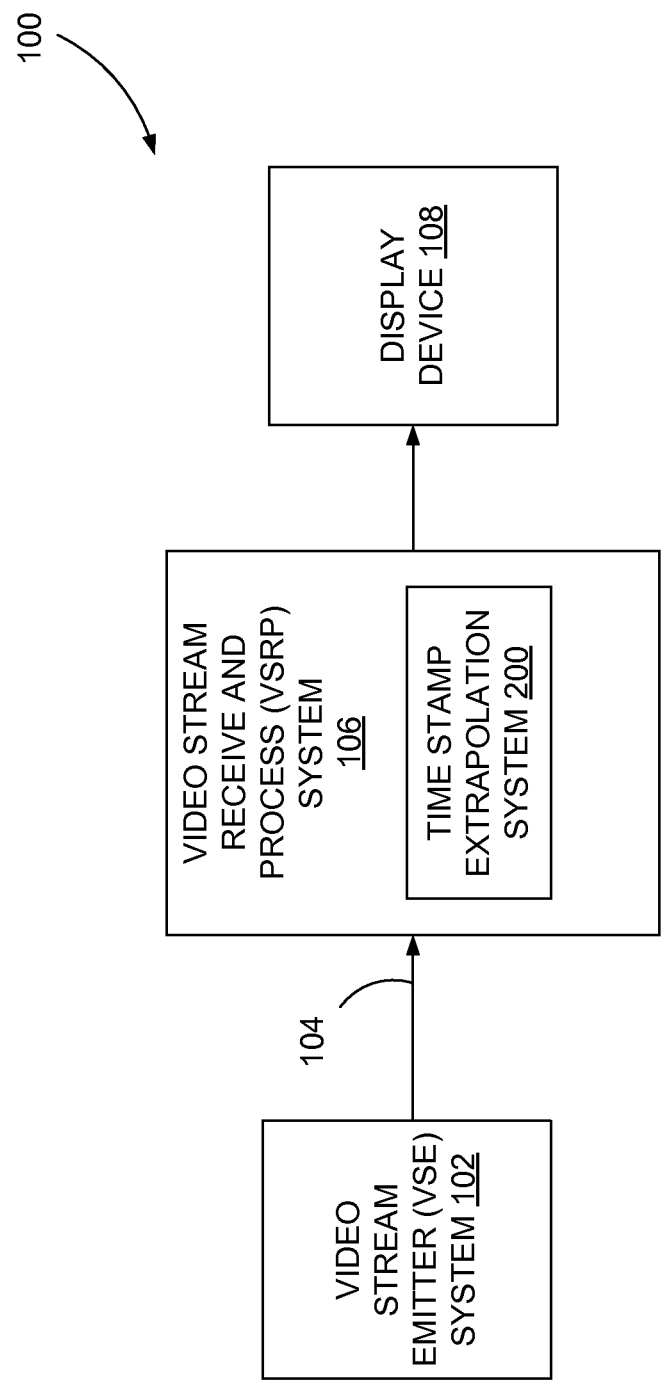
FIG. 1 is a block diagram that illustrates an example environment in which time stamp extrapolation (TSE) systems and methods can be implemented.

In one method embodiment, receiving a video stream comprising a first compressed picture without associated time stamp information and a second compressed picture having associated first time stamp information, the second compressed picture following the first compressed picture in transmission order; deriving second time stamp information based on the first time stamp information; and processing the first compressed picture based on the second time stamp information.

Example Embodiments

Disclosed herein are various example embodiments of time stamp extrapolation (TSE) systems and methods (collectively, referred to herein also as a TSE system or TSE systems) that comprise logic (e.g., hardware, software, or a combination of hardware and software) configured to receive and cache (e.g., buffer) compressed pictures of a video stream, a portion of which do not possess or are otherwise not associated with time stamp information (e.g., presentation time stamp (PTS), decoding time stamp (DTS), or a combination of both), determine a backwards extrapolation period (BEP) based on the reception of time stamp information received subsequent to those pictures unassociated with time stamp information, backwards extrapolate the received time stamp information to compute time stamp information for the pictures corresponding to the BEP, and decode and provide for presentation (or other processing and/or destination) one or more of the decoded pictures possessing the extrapolated time stamp information.

Various scenarios may arise where backwards extrapolation of PTS/DTS values from explicitly received PTS/DTS values to obtain extrapolated PTS/DTS values may reduce decoding and/or presentation delays and improve viewer experience in the reception of audio, video, and/or data services (collectively or individually also referred to herein as media content). For instance, responsive to a video stream transition event such as a channel change in an Internet Protocol Television (IPTV) network environment, a digital receiver may not receive PTS/DTS values for a received intra-coded (I) picture needed to decode the compressed I picture (and any subsequent dependent compressed pictures, which are typically discarded when received without associated time stamp information), which may result in a delay period corresponding to the time to receive an I picture whose PTS/DTS information is explicitly provided in the video stream.

Another example scenario is where I-pictures are transmitted less frequently, such as for bit-rate reduction. Even if all I-pictures possessed explicit PTS/DTS information, delays may result due to the fact that pictures received prior to the I-picture may not be decodable.

An additional scenario may arise in application-specific or proprietary implementations that deviate from standards or specifications in the frequency of inclusion of time stamp information in the video stream.

By performing backwards extrapolation to compute time stamp information for one or more frames responsive to a stream transition event, decoding logic is enabled to start decoding and processing for presentation compressed pictures that otherwise may have been discarded, hence reducing delays associated with the stream transition event or otherwise providing additional benefits.

These and/or other features, among others, are described hereinafter in the context of an example subscriber television network environment, with the understanding that other multi-media (e.g., video, graphics, audio, and/or data) environments may also benefit from certain embodiments of the TSE systems and methods and hence are contemplated to be within the scope of the disclosure. It should be understood by one having ordinary skill in the art that, though specifics for one or more embodiments are disclosed herein, such specifics as described are not necessarily part of every embodiment.

FIG. 1 is a block diagram of an example environment, a subscriber television network 100, in which certain embodiments of TSE systems and/or methods may be implemented.

The subscriber television network 100 includes one or more video stream emitter systems, such as video stream emitter (VSE) system 102, coupled to one or more video stream receive and process systems, such as video stream receive and process (VSRP) system 106, over a communications medium 104. The VSRP system 106 is further coupled to a display device 108. In one implementation, the display device 108 is configured with an audio component (e.g., speakers), whereas in some implementations, audio functionality may be provided by a device that is separate yet communicatively coupled to the display device 108 and/or VSRP system 106. The VSRP system 106 further includes a time stamp extrapolation (TSE) system 200, which is explained further below. Note that in some embodiments, functionality of the TSE system 200 may be incorporated elsewhere in the subscriber television network 100, such as in display device 108.

The subscriber television network 100 may comprise an IPTV network, a cable television network, a satellite television network, or a combination of two or more of these networks or other networks. Further, network PVR and switched digital video are also considered within the scope of the disclosure. Although described in the context of video processing, it should be understood that certain embodiments of the TSE systems 200 described herein also include functionality for the processing of other media content such as compressed audio streams.

The VSE system 102 comprises one or more servers, routers, and/or switches (e.g., at the network edge, among other locations) that process and deliver and/or forward (e.g., route) various digital services to subscribers. Such digital services may include broadcast television programming, video-on-demand (VOD), pay-per-view, music, Internet access, commerce (e.g., home-shopping), voice-over-IP (VOIP), and/or other telephone or data services. The VSE system 102 may reside at a headend, or other locations such as a hub or node. The VSE system 102 may receive content from sources external to the VSE system 102 or subscriber television network 100 via a wired or wireless (e.g., satellite or terrestrial network), such as from content providers, and in some embodiments, package-selected national or regional content with local programming (e.g., including local advertising) for delivery to subscribers.

In one embodiment, the VSE system 102 comprises one or more encoding devices that encodes locally- and/or remotely-provided audiovisual content (including data) according to the syntax and semantics of a video and/or audio coding standard or specification, such as MPEG-2, Advanced Video Coding (AVC), etc. In one implementation, the encoded audiovisual content for a single program may be carried in a single MPEG-2 program stream (e.g., one or more packetized elementary stream (PES) packet streams sharing a common time base), and in other implementations, the encoded audiovisual content for multiple programs may be carried as multiple MPEG-2 programs that are multiplexed into an MPEG-2 transport stream, each MPEG-2 program associated with its own respective time base. It should be understood that, although MPEG-based video encoding and transport is described throughout the disclosure, encoding and transport according to other specifications and/or standards (including proprietary mechanisms) may similarly benefit from the TSE systems 200 described herein and hence are contemplated to be within the scope of the disclosure.

In IPTV implementations, the program or transport stream is further encapsulated in Internet protocol (IP) packets, and delivered via multicast (e.g., according to protocols based on Internet Group Management Protocol (IGMP), among other protocols), or in the case of video-on-demand (VOD), via unicast (e.g., Real-time Streaming Protocol or RTSP, among other protocols). For instance, multicast may be used to provide multiple user programs destined for many different subscribers. In some implementations, unicast delivery may serve as an intermediary video stream delivery mechanism when switching among multicast groups.

In some embodiments, the VSE system 102 may also comprise other components, such as QAM modulators, routers, bridges, Internet Service Provider (ISP) facility servers, private servers, on-demand servers, channel change servers, multi-media messaging servers, program guide servers, gateways, multiplexers, and/or transmitters, among other equipment, components, and/or devices well-known to those having ordinary skill in the art. Further, communication of IP packets between the VSE system 102 and the VSRP system 106 may be implemented according to one or more of a plurality of different protocols or communication mechanisms, such as User Datagram Protocol (UDP)/IP, Transmission Control Protocol (TCP)/IP, transport packets encapsulated directly within UDP or Real-time Transport Protocol (RTP) packets, among others.

The communications medium 104 may comprise a single network, or a combination of networks (e.g., local and/or wide area networks). For instance, the communications medium 104 may comprise a wired connection or wireless connection (e.g., satellite, wireless LAN, etc.), or a combination of both. In the case of wired implementations, communications medium 104 may comprise a hybrid-fiber coaxial (HFC) medium, coaxial, optical, twisted pair, etc. Other networks are contemplated to be within the scope of the disclosure, including networks that use packets incorporated with and/or compliant to other transport protocols or standards or specifications.

The VSRP system 106 (also referred to herein as a digital receiver or processing device) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP system 106 may be coupled to the display device 108 (e.g., computer monitor, television set, etc.), or in some embodiments, may comprise an integrated display (with or without an integrated audio component).

Figure 2:
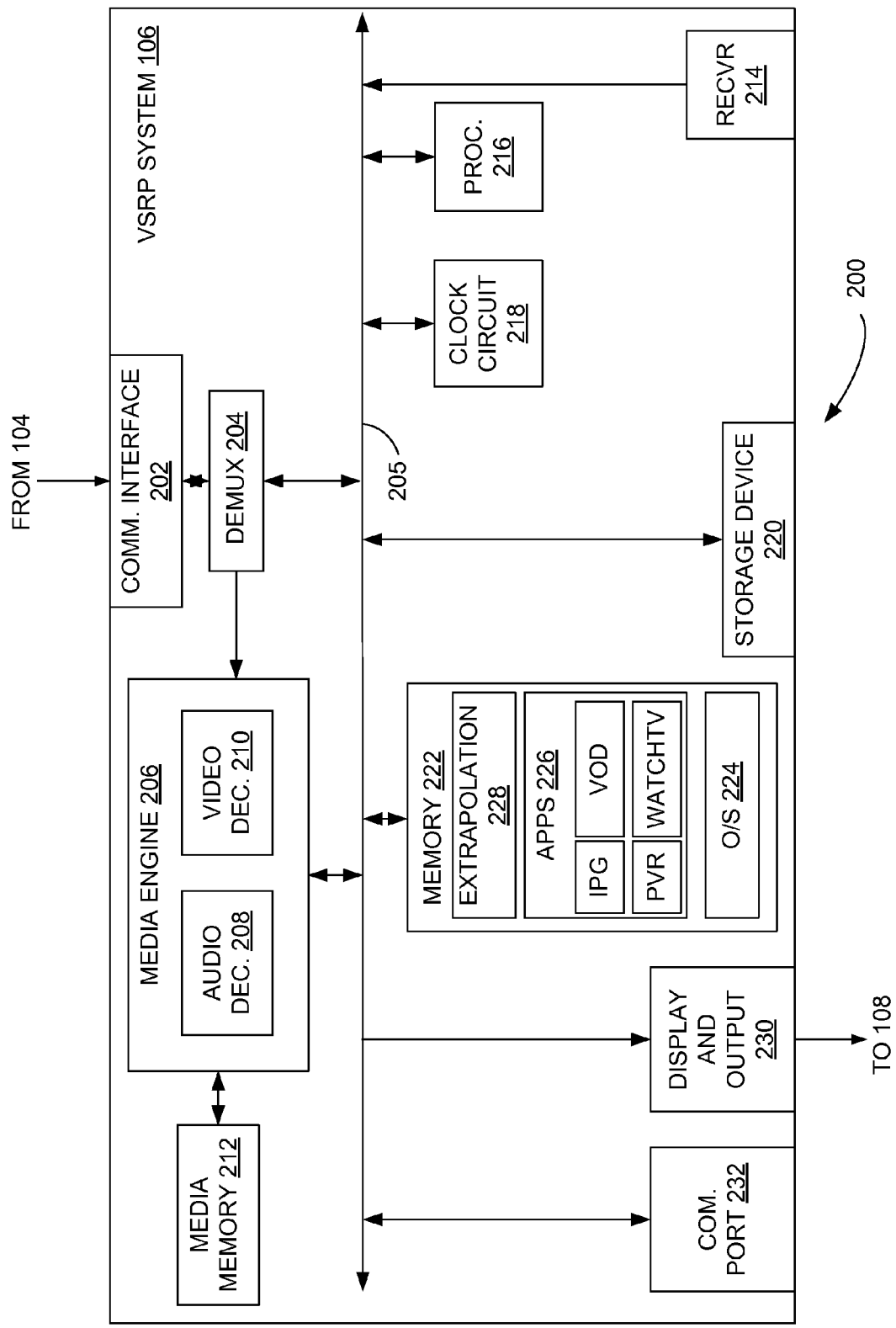
FIG. 2 is a block diagram of an example embodiment of a video stream receive and process (VSRP) system comprising an embodiment of a TSE system.

FIG. 2 is an example embodiment of select components of a VSRP system 106 comprising an embodiment of TSE system 200. It should be understood by one having ordinary skill in the art that the VSRP system 106 shown in FIG. 2 is merely illustrative, and should not be construed as implying any limitations upon the scope of the disclosure. In one embodiment, the TSE system 200 may comprise all components shown in, or described in association with, the VSRP system 106. In some embodiments, the TSE system 200 may comprise fewer components, such as those limited to facilitating and implementing the decoding of compressed video streams. In some embodiments, functionality of the TSE system 200 may be distributed among the VSRP system 106 and one or more additional devices.

The VSRP system 106 includes a communication interface 202 (e.g., depending on the implementation, suitable for coupling to the Internet, a coaxial cable network, an HFC network, wireless network, etc.) coupled to a demultiplexer 204 (hereinafter, referred to also as a demux 204). The demux 204 is configured to identify and extract information in the video stream (e.g., transport stream) to facilitate the identification, extraction, and processing of the compressed pictures. Such information includes Program Specific Information (PSI)

(e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information). In one embodiment, the demux 204 is configured with programmable hardware (e.g., PES packet filters). In some embodiments, the demux 204 is configured in software, or a combination of hardware and software.

The demux 204 is coupled to a bus 205 and to a media engine 206. The media engine 206 comprises, in one embodiment, decoding logic comprising one or more of a respective audio decoder 208 and video decoder 210. The media engine 206 is further coupled to the bus 205 and to media memory 212, which in one embodiment comprises one or more buffers for temporarily storing compressed and/or reconstructed pictures. In some embodiments, the buffers of the media memory 212 may reside in other memory (e.g., memory 222, explained below). The VSRP system 106 further comprises additional components coupled to bus 205. For instance, VSRP system 106 further comprises a receiver 214 configured to receive user input (e.g., via direct-physical or wireless connection via a keyboard, remote control, voice activation, etc.) to convey a user's request or command (e.g., for program selection, stream manipulation such as fast forward, rewind, pause, channel change, etc.), one or more processors (one shown) 216 for controlling operations of the VSRP system 106, and a clock circuit 218 comprising phase and/or frequency locked-loop circuitry to lock into system clock information (e.g., program clock reference, or PCR, which is used to reconstruct the system time clock (STC) at the VSRP system 106) received in the video stream (e.g., adaptation field of the transport stream) to facilitate decoding operations and to clock the output of reconstructed audiovisual content. In some embodiments, clock circuit 218 may comprise plural (e.g., independent or dependent) circuits for respective video and audio decoding operations. Although described in the context of hardware circuitry, some embodiments of the clock circuit 218 may be configured as software (e.g., virtual clocks) or a combination of hardware and software. Further, in some embodiments, the clock circuit 218 is programmable.

The VSRP system 106 further comprises a storage device 220 (and associated control logic) to temporarily store buffered content and/or more permanently store recorded content. Memory 222 in the VSRP system 106 comprises volatile and/or non-volatile memory, and is configured to store executable instructions or code associated with an operating system 224, and one or more applications 226 (e.g., interactive programming guide (IPG), video-on-demand (VOD), personal video recording (PVR), WatchTV (associated with broadcast network TV), among other applications such as pay-per-view, music, driver software, etc.). Further included in one embodiment in memory 222 is extrapolation logic 228, which in one embodiment is configured in software. In some embodiments, extrapolation logic 228 may be configured in hardware, or a combination of hardware and software. The extrapolation logic 228, described further below, is responsible for computing extrapolated values for presentation and/or decoding time stamps for cached or buffered compressed pictures that are without associated time stamp information (e.g., PTS or DTS values). Explicit PTS/DTS values and extrapolated values (for PTS and DTS) are compared to the reconstructed STC (generated by the clock circuit 218) to enable a determination of when the buffered compressed pictures are provided to the video decoder 210 for decoding (DTS) and when the buffered, decoded pictures are output by the video decoder 210 (PTS) to display and output logic 230 for processing and subsequent presentation on a display device 108.

The VSRP system 106 is further configured with the display and output logic 230, as indicated above, which includes graphics and video processing pipelines as known in the art to process the decoded pictures and provide for presentation (e.g., display) on display device 108. A communications port 232 (or ports) is further included in the VSRP system 106 for receiving information from and transmitting information to other devices. For instance, the communication port 232 may feature USB (Universal Serial Bus), Ethernet, IEEE-1394, serial, and/or parallel ports, etc. The VSRP system 106 may also include an analog video input port for receiving analog video signals.

One having ordinary skill in the art should understand that the VSRP system 106 may include other components not shown, including a tuning system with one or more tuners, demodulators, compression engine, memory, decryptors, samplers, digitizers (e.g., analog-to-digital converters), multiplexers, conditional access processor and/or application software, driver software, Internet browser, among others. Further, though the extrapolation logic 228 is illustrated as residing in memory 222, it should be understood that such logic 228 may be incorporated in the media engine 206 in some embodiments, or elsewhere. Similarly, in some embodiments, functionality for one or more of the components illustrated in, or described in association with, FIG. 2 may be combined with another component into a single integrated component or device.

Having described an example embodiment for a VSRP system 106, attention is directed to FIGS. 2 and 3 where select components and corresponding processing from the TSE system 200 are further explained. As set forth above, the VSRP system 106 includes a communication interface 202 configured to receive an audiovisual program (e.g., on-demand or broadcast program) delivered as, among other media content components, a sequence of compressed pictures of a video stream. The discussion that follows assumes a stream transition event corresponding to a user- or system-prompted channel change event (e.g., the channel change implemented to go from one multicast group to another via a channel change server located at the VSE system 102 or elsewhere), resulting in the transmittal and subsequent reception and processing of a single program transport stream in the context of an IPTV environment. It should be appreciated that the TSE system embodiments disclosed herein are not limited to channel change implementations, but also contemplate other stream transition events (e.g., VOD and stream manipulation, local advertisement insertion, etc.) and/or non-IPTV environments (e.g., dedicated transmissions) that may share one or more of the scenarios set forth in the beginning of the disclosure or have conditions that the TSE system embodiments can remedy or mitigate.

In addition, the parameters the TSE system embodiments detect in the transport stream (including the PES packets) to facilitate identification and extraction are based on an assumption of MPEG-based transport. However, it should be appreciated that systems in which time stamp information and other identifying parameters are conveyed by other mechanisms (e.g., not extracted from a transport stream or PES packet) may also benefit from the concepts disclosed herein and hence are contemplated to be within the scope of the disclosure. For instance, time stamp information may reside in a packet header for which application software in the VSRP system 106 is configured to receive and process in some embodiments (i.e., without extraction from a transport stream).

With reference to FIG. 3, shown is a block diagram that illustrates a video stream 300 comprising a sequence (in transmission order) of compressed pictures (such as conveyed over communications medium 104 as a transport stream encapsulated in IP), the compression denoted by a "C" prefix to the picture type (e.g., "CB" is a compressed "B" picture, "CI" is a compressed "I" picture, etc.). Although the video stream 300 is illustrated in FIG. 3 as possessing a particular picture sequence pattern (e.g., IBBPB ... PBBI) common to an MPEG-2 group of pictures (GOP), it should be understood that other picture sequence patterns are contemplated to be within the scope of the disclosure. The channel change is denoted by arrow 304. Further, the highlighted compressed pictures 302, 306, and 308 (denoted in FIG. 3 by heavier border thickness, such as for the first and last "CB" pictures and the "CP" picture) symbolize pictures that possess or are otherwise associated with time stamp information (explicit time stamp information), whereas the non-highlighted pictures (e.g., CI 312, CB 314, CB 316, etc.) have no associated time stamp information at the present snapshot in time (pre-extrapolation) represented by FIG. 3.

In one embodiment, the TSE system 200 backwards extrapolates time stamp information (explicitly received in the video stream 300) according to a backwards extrapolation period (BEP), as described further below. In general, certain compressed pictures (compressed pictures 312, 314, and 316) are received and cached (e.g., buffered) by the TSE system 200, and such pictures have no corresponding time stamp information when cached. At a time corresponding to receiving the first picture, since the channel change event, that has explicit time stamp information (e.g., compressed picture 306), the TSE system 200 backwards extrapolates the explicit time stamp information according to a fixed, or in some embodiments configurable, BEP to derive time stamp information for one or more of the cached pictures 312, 314, 316 received and retained in a buffer (e.g., in media memory 212) prior to compressed picture 306.

FIGS. 4A-4B illustrate timing diagrams 400A and 400B, respectively, corresponding to some example BEP embodiments. In one embodiment, the BEP may be a fixed parameter stored locally in the VSRP system 106 (e.g., as programmed at the time of start-up or manufacture), and in some embodiments, the BEP may be programmable or otherwise configurable (e.g., based on signaling from a remote location, such as via system operator input, based on parameters in the received video stream, and/or based on local input from a user or service technician via a displayed interface of selectable BEP options). In one embodiment, referring to diagram 400A of FIG. 4A, the start 402 of the BEP 410A corresponds to the locking of the PCR received in the video stream (e.g., in the adaptation field of the transport stream) for the associated audiovisual program. For instance, responsive to the channel change event 304, the demux 204 receives information (e.g., a PMT) in the transport stream that the demux 204 uses to identify the PIDs of the video, audio, and/or data streams corresponding to the requested video program. The identification may further serve to assist the demux 204 in rejecting secondary audio programs (SAPs) that are not required. In some embodiments, the appropriate PMT packet may be identified by a transmitted PAT, whereas in some embodiments, the PAT is not required (e.g., since the PMT is known a priori).

Responsive to the information (e.g., of the PMT, which signals the packet location of the PCR), the demux 204 parses the transport stream and extracts the PCR value from the identified packet and communicates the extracted PCR value and time corresponding to the associated packet arrival to the clock circuit 218, the extrapolation logic 228, and the media engine 206. In one embodiment, the clock circuit 218 locks to the PCR, and the extrapolation logic 228 initiates the BEP 410A. For instance, in one embodiment, the media engine 206 uses the arrival time of the transport stream packet carrying the PCR value and the PCR value itself to adjust control elements of the clock circuit 218. The demux 204 continues to parse packets of the transport stream and extract the packets corresponding to the compressed pictures for the requested video program, and the compressed pictures are stored in media memory 212. As explained above, in the present example, compressed pictures 312, 314, and 316 do not have associated time stamp information (e.g., are missing an associated PTS or PTS/DTS). The extrapolation logic 228 defines the end 404 of the BEP 410A based on the extraction of the compressed picture 306, which comprises explicit time stamp information (e.g., possesses or is associated with a PTS) carried in one embodiment in the PES packet header corresponding to compressed picture 306. The extrapolation logic 228 then performs backwards extrapolation according to the BEP 410A in a manner as explained further below.

In the embodiment illustrated in the diagram 400B of FIG. 4B, the extrapolation logic 228 defines the end 404 of the BEP 410B in the manner similar to that described above in association with FIG. 4A (e.g., based on reception of explicit time stamp information), and determines a start 406 based on the point of ingestion or acquisition of the video program. For instance, one parameter the extrapolation logic 228 uses to start the BEP 410B is the payload_unit_start_indicator carried in the transport stream header. When the payload_unit_start_indicator is set to a value of 1, this is an indication that the MPEG-2 transport stream packet's payload field begins with the first byte of an MPEG-2 PES packet under the constraint that only a single MPEG-2 PES packet may begin in a transport stream packet, hence enabling identification of the start of a picture or access unit. The extrapolation logic 228 performs backwards extrapolation based on the determined start 406 and completion 404 of the BEP 410B in a manner as explained further below. The detection of the payload_unit_start_indicator enables the determination of the BEP 410B without the locking of the PCR, and thus may enable a shorter delay in decoding and presentation for the requested video program.

Note that in some embodiments, the PMT may be cached in advance for each channel (e.g., physical or logical channel) that was previously accessed, and hence, the compressed pictures may be cached responsive to the channel change event without seeking to detect the PMT (since it is known and cached in advance). In other words, the BEP 410 may be initiated even further back in time than the above-described embodiments by detection of the payload_unit_start_indicator without seeking the PMT responsive to the stream transition event.

Regardless of the method used by the extrapolation logic 228 to define the BEP 410, the extrapolation logic 228 performs backwards extrapolation to compute the PTS/DTS values (e.g., based on using the frame or picture rate and the picture types received so far) for the compressed pictures it has received but not decoded yet (i.e., compressed 312, 314, and 316). In one embodiment, the extrapolation logic 228 determines the out-of-orderness (PTS-to-DTS relationship) based on the recorded picture type and a record of the picture sequence pattern (e.g., GOP structure) used in the video stream. The picture sequence pattern may be determined from previous access to the channel for the requested video program, from industry practice (e.g., MPEG-2 video typically uses a common GOP structure), or according to other mechanisms.

Note that a source of delay is defined by DTS-PCR. If the video decoder 210 waited to fill the buffer (e.g., in media memory 212, such as a video bit-buffer in MPEG-2 or compressed picture buffer in AVC), there may be a longer channel change time since the first determined DTS (at the time of receiving the first PTS) is farther out in time (in relation to PCR) since video coding imparts a DTS-PCR delay for rate management purposes and to avoid bit-buffer underflow. Besides, because of the constant bit rate (CBR) channel practiced in IPTV, each picture has a DTS-PCR delay of approximately equal to the GOP size (typically half a second for MPEG-2 video, or one (1) second or more for AVC). The DTS-PCR delay is also referred to as an initial bit buffer delay. In essence, the TSE system 200, by backwards extrapolating the PTS values, can reduce or eliminate the initial bit buffer delay that may have been incurred after obtaining the first DTS.

Because the extrapolation logic 228 performs backwards extrapolation of time stamp information for the previously cached or buffered compressed pictures, then such compressed and buffered pictures can be decoded and output for subsequent presentation. In one embodiment, such compressed and buffered pictures can be decoded and output if their respectively corresponding determined DTS (computed according to the extrapolated PTS and inferred picture sequence pattern) is greater than or equal to the STC value. In some embodiments, explained further below, output and presentation occurs despite the expiration of the extrapolated PTS/DTS values.

In some cases, the first displayed picture is an I-picture and sometimes it is not. In either case, from the user's perspective, the channel change time may be reduced since one approach of the TSE system 200 allows the video decoder 210 to present for display the pictures before it receives an I-picture whose time stamp information (e.g., PTS/DTS) is known.

With regard to the above-referenced embodiments where output and presentation is conditioned on whether the backwards extrapolated PTS/DTS values have expired, the selection of pictures for decoding and output is illustrated in the examples presented in the diagrams 500A and 500B of FIGS. 5A and 5B, respectively. Assume there are compressed pictures in the picture sequence pattern of the video stream 300 of FIG. 3 that are already received and whose extrapolated (or inferred) PTS deadlines have not yet been reached (e.g., the PTS/DTS values have not expired when compared to the reconstructed STC values). In such a scenario, the video decoder 210 starts decoding the pictures that it previously did not decode (e.g., compressed pictures 312, 314, 316, etc.) and presents for display (e.g., via display and output logic 230) the pictures based on the extrapolated PTS deadlines. In the example diagram 500A shown in FIG. 5A, if none of the earlier pictures' PTS deadlines have expired by the time the backward extrapolation is complete, and the earlier pictures are decoded, all decoded pictures (extending back to that associated with compressed picture 312) can be presented for display.

Referring to FIG. 5B, an example is shown where the PTS deadlines for those pictures corresponding to compressed pictures 312 and 314 (i.e., located in the column beneath 314 and 316 in diagram 500B) have expired. In other words, in this example, only the "B" picture, located in the column in diagram 500B beneath compressed "B" picture 316, has a backwards extrapolated PTS/DTS value that has not expired (e.g., greater than or equal to the STC value). Accordingly, in this embodiment, only one picture having the backwards extrapolated PTS/DTS value is output for presentation.

In the worst case, the video decoder 210 cannot decode the first I-picture it receives, and hence it waits until the next I picture. Hence, the channel change time difference between the best (FIG. 5A) and worst case scenarios is one GOP duration for the present example corresponding to FIG. 3, which practically speaking, can range in some embodiments from 500 milliseconds (ms) to a few seconds. As noted, FIG. 5B represents an intervening case (between best and worst).

With regard to another embodiment referenced above, an output and presentation result may follow in accordance with a best case condition (e.g., FIG. 5A) regardless of expiration of the backwards extrapolated PTS/DTS values. In such embodiments, the TSE system 200 operates with decoding functionality that employ clock circuits 218 configured for programmable system time clock (STCs) operation. For a given BEP, the TSE system 200 directs its attention to the first decodable picture (hereinafter referred to PIC1 for brevity in explanation) for which a PTS/DTS value has been backwards extrapolated. If the backwards extrapolated value of PTS/DTS for PIC1 has expired, instead of discarding PIC1 and any subsequent pictures (i.e., "late" pictures that also have expired PTS/DTS values), the STC may be "rewound" (or generally, reconfigured) to cause the STC value to be equal to the DTS value of PIC1. In this manner, PIC1 (and any subsequent late pictures) may be output for presentation. In such an embodiment, there may be no added advantages in terms of channel change time, but bit-buffer size may increase to accommodate pictures that, without this technique, would have been discarded. Further, a difference between the PCR and the local STC may be introduced (e.g., in view of the negative time offset to the STC). However, in some implementations, equality in the values of STC and PCR may not be strictly adhered to nor required (e.g., in software-controlled STC provision), and hence, it is often sufficient for the STC rate to follow the PCR rate (e.g., with a constant offset).

In some embodiments, the STC is rewound to a value sufficient to enable decoding and display of the first and subsequent decodable pictures in the buffer (e.g., STC value at least equal to the DTS value or PTS value if the DTS value is not calculated). In some embodiments, in view of the potential buffer and/or offset implications noted above, the amount of rewind of the STC may be the minimum of the following: the time offset between the DTS of the first decodable picture in the buffer and the value of the STC at the time the TSE is complete, the amount of free space in the bit buffer in terms of time (e.g., free buffer size/stream bit-rate), and the maximum amount of time shift, with respect to real-time, that is tolerable.

The TSE system 200 may be implemented in hardware, software, firmware, or a combination thereof. To the extent certain embodiments of the TSE system 200 or a portion thereof are implemented in software or firmware, executable instructions for performing one or more tasks of the TSE system 200 are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the TSE system 200 or a portion thereof are implemented in hardware, the TSE system 200 may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Figure 6:
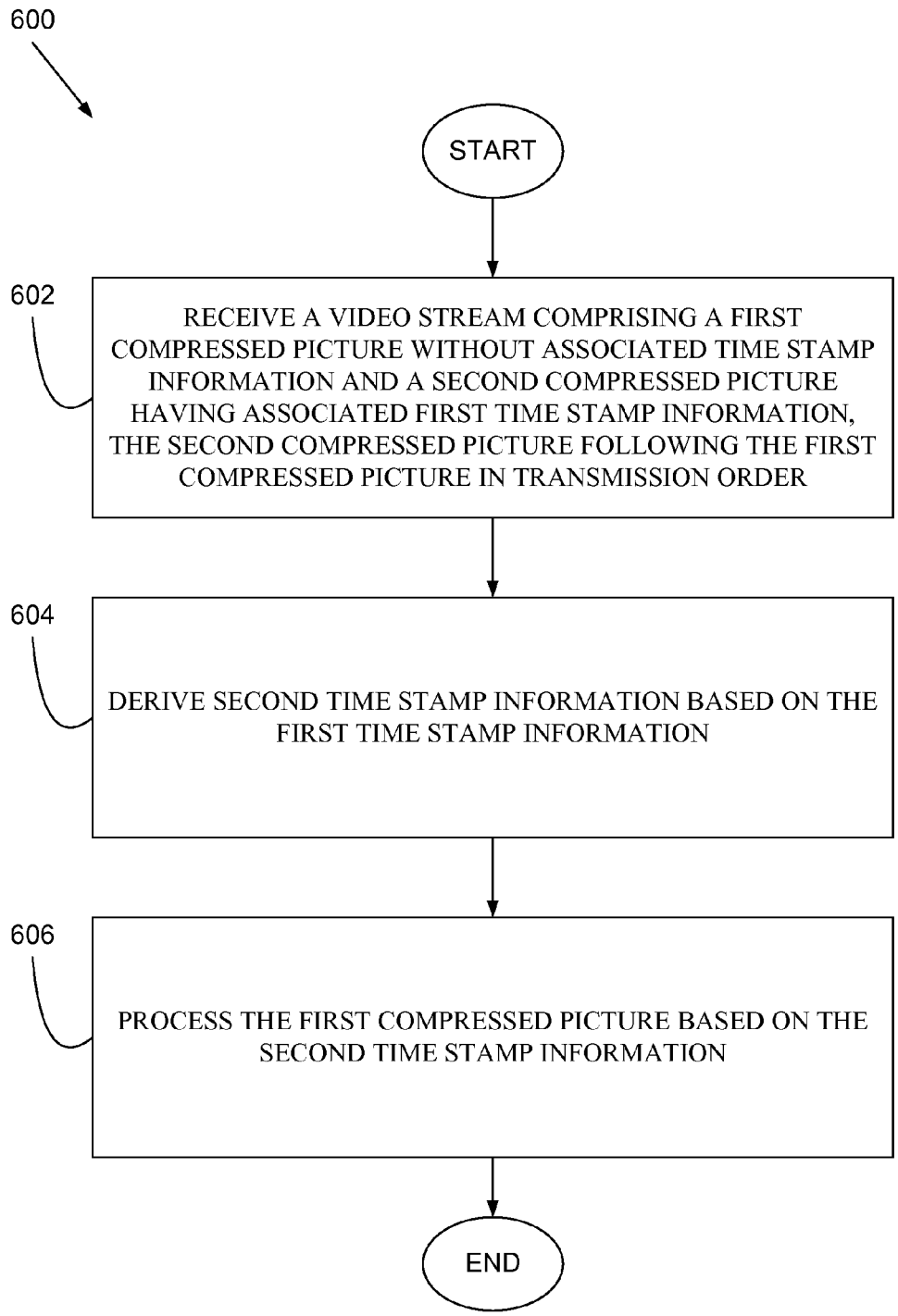
FIG. 6 is a flow diagram that illustrates one example TSE method embodiment.

Having described various embodiments of TSE system 200, it should be appreciated that one method embodiment 600, implemented in one embodiment by logic (hardware, software, or a combination thereof) of the TSE system 200 and shown in FIG. 6, comprises receiving a video stream comprising a first compressed picture without associated time stamp information and a second compressed picture having associated first time stamp information, the second compressed picture following the first compressed picture in transmission order (602), deriving second time stamp information based on the first time stamp information (604), and processing the first compressed picture based on the second time stamp information (606).

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of a process identified in FIG. 6 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to one or more of the methods described in FIG. 6, either in the beginning, end, and/or as intervening steps.

It should be emphasized that the above-described embodiments of the present disclosure are merely possible examples of implementations, merely set forth for a clear understanding of the principles of the TSE systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method, comprising:
   receiving a video stream comprising a first compressed picture without associated time stamp information and a second compressed picture having associated first time stamp information, the second compressed picture following the first compressed picture in transmission order;
   deriving second time stamp information based on the first time stamp information, wherein deriving the second time stamp information comprises:
   determining a backward extrapolation period (BEP), wherein determining the BEP comprises locating a predetermined BEP value,
   determining a start time for the backward extrapolation period, wherein the start time is a time of ingestion of the video stream,
   performing backward extrapolation based on the start time and the backward extrapolation period; and
   determining whether a value corresponding to the second time stamp information has expired and, responsive to the determination, reconfiguring a system time clock to match the value to enable the processing; and
   processing the first compressed picture based on the second time stamp information.

2. The method of claim 1, wherein receiving the video stream is responsive to a stream transition event.

3. The method of claim 1, wherein the first time stamp information corresponds to a presentation time stamp or a combination of a presentation time stamp and a decoding time stamp.

4. The method of claim 1, wherein the deriving further comprises computing the second time stamp information based on backwards extrapolating the first time stamp information, the backwards extrapolation based on frame rate information and picture sequence pattern information.

5. The method of claim 4, wherein the picture sequence pattern information comprises picture type information and decoding time stamp and presentation time stamp differences for each picture corresponding to a picture sequence pattern.

6. The method of claim 1, further comprising determining whether a value corresponding to the second time stamp information has expired, wherein the processing is responsive to the value corresponding to the second time stamp information not having expired.

7. The method of claim 1, wherein deriving further comprises deriving plural time stamp information based on the first time stamp information, a portion of the plural time stamp information allocated to each respective compressed picture of the additional compressed pictures.

8. The method of claim 7, further comprising:
   determining whether each value corresponding to the allocated time stamp information of the plural time stamp information has expired; and
   wherein the processing comprises, responsive to the determination, processing exclusively the compressed pictures corresponding to the respective allocated time stamp information that has not expired or processing the compressed pictures associated with corresponding reconfigured system clock values.

9. The method of claim 1, wherein processing comprises decoding.

10. The method of claim 9, wherein the decoding is implemented responsive to the second time stamp information.

11. The method of claim 1, wherein processing comprises decoding and preparing for presentation.

12. A system, comprising:
   a processing device configured to:
   receive a transport stream comprising plural compressed pictures of a video steam, the compressed pictures comprising a first portion of compressed pictures with no corresponding presentation time stamp (PTS) assignment and a second portion comprising at least one compressed picture following the first portion in transmission order, the at least one compressed picture comprising a first PTS;
   backwards extrapolate the first PTS to derive an extrapolated PTS value for each respective compressed picture of the first portion, wherein deriving extrapolated picture comprises:

determining a backward extrapolation period (BEP), wherein determining the BEP comprises locating a predetermined BEP value, determining a start time for the backward extrapolation period, wherein the start time is a time of ingestion of the video stream, performing backward extrapolation based on the start time and the backward extrapolation period; and determining whether a value corresponding to the second time stamp information has expired and, responsive to the determination, reconfiguring a system time clock to match the value to enable the processing; and process at least part of the first portion based on the extrapolated PTS values.

13. The system of claim 12, wherein the processing device is further configured to store the received first portion in a buffer, wherein the processing device is configured to process by decoding the at least part of the first portion only in response to reception of first PTS.

14. The system of claim 12, wherein the processing device is configured to backwards extrapolate based on the backwards extrapolation period (BEP), the BEP defined by the start time corresponding to a start of locking by the processing device to a program clock reference (PCR) received in the transport stream and a completion time corresponding to receipt by the processing device of the first PTS.

15. The system of claim 12, wherein the processing device is configured to backwards extrapolate based on the backwards extrapolation period (BEP), the BEP defined by a start time corresponding to receipt of a first picture of the first portion by the processing device and a completion time corresponding to receipt by the processing device of the first PTS, wherein the processing device is configured to detect receipt of the first picture by detecting the first payload unit start indicator in the received transport stream.

16. The system of claim 12, wherein the processing device is configured to backwards extrapolate based on frame rate information and group of picture (GOP) information, wherein the GOP information comprises picture type information and decoding time stamp (DTS) and presentation time stamp (PTS) differences for each picture corresponding to a GOP.

17. The system of claim 12, wherein the processing device is further configured to determine whether the extrapolated values have expired, wherein the processing device is further configured to either process the first portion corresponding exclusively to an unexpired value or unexpired values or process the first portion associated with reconfigured system time clock values.

18. The system of claim 12, further comprising a display device, wherein the processing device is configured to process by decoding the at least part of the first portion and preparing the decoded first part for display on the display device.

19. A system, comprising:

means for buffering a media content stream comprising a first compressed media content without associated time stamp information and a second compressed media content having associated first time stamp information, the second compressed media content following the first compressed media content in transmission order; and means for computing second time stamp information based on the first time stamp information and processing the first compressed media content based on the second time stamp information, wherein computing the second time stamp information comprises:

determining a backward extrapolation period(BEP), wherein determining the BEP comprises locating a predetermined BEP value, determining a start time for the backward extrapolation period, wherein the start time is a time of ingestion of the video stream, determining whether a value corresponding to the second time stamp information has expired and, responsive to the determination, reconfiguring a system time clock to match the value to enable the processing; and performing backward extrapolation based on the start time and the backward extrapolation period.

\* \* \* \* \*